US012712731B2

(12) United States Patent
Fuller

(10) Patent No.: US 12,712,731 B2
(45) Date of Patent: Aug. 18, 2026

(54) APPARATUS AND METHODS FOR PRIME FIELD MODULAR REDUCTION

(71) Applicant: Microsoft Technology Licensing, LLC, Redmond, WA (US)

(72) Inventor: Jay Scott Fuller, Scotts Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 18/501,256

(22) Filed: Nov. 3, 2023

(65) Prior Publication Data

US 2025/0150271 A1 May 8, 2025

(51) Int. Cl.
*H04L 9/30* (2006.01)

(52) U.S. Cl.
CPC .................................. *H04L 9/3066* (2013.01)

(58) Field of Classification Search
CPC .................................................... H04L 9/3066
See application file for complete search history.

(56) References Cited

U.S. PATENT DOCUMENTS 5,146,421 A 9/1992 Adiletta
5,297,206 A * 3/1994 Orton ........................ H04L 9/30 713/180
5,793,659 A 8/1998 Chen
8,233,615 B2 7/2012 Douguet
8,793,300 B2 * 7/2014 Niel ...................... G06F 7/5443 708/603
10,298,385 B2 5/2019 Khedr
10,884,734 B2 1/2021 Boswell
11,354,097 B2 6/2022 Liu
2003/0065695 A1 4/2003 Ruehle
2008/0025502 A1 1/2008 Kounavis
2011/0276790 A1 * 11/2011 Olson ................ G06F 9/30076 712/222

(Continued)

OTHER PUBLICATIONS

National Institute of Standards and Technology, "Module-Lattice-based Key-Encapsulation Mechanism Standard", FIPS 203, Aug. 24, 2023, 49 pages.

(Continued)

*Primary Examiner* — Rupal Dharia
*Assistant Examiner* — Devin E Almeida
(74) *Attorney, Agent, or Firm* — Michael T. Abramson; Jordan IP Law, LLC

(57) ABSTRACT

Apparatus and methods for prime field modular reduction are described. As an example, a custom modular reduction digital circuit for reducing an n-bit integer based on a modulus, where the modulus comprises a k-bit integer for use with a cryptographic algorithm, is described. The custom modular reduction digital circuit includes a first circuit to generate at least two partial results by processing: (1) k lower order significant bits of the n-bit integer and (2) at least a subset of bits for congruent representations corresponding to any n-k higher order bits of the n-bit integer that are higher in significance than the most significant bit of the k-bit integer. The custom modular reduction digital circuit further includes a second circuit to process the at least two partial results, output by the first circuit, to generate a reduced version of the n-bit integer for use with the cryptographic algorithm.

20 Claims, 8 Drawing Sheets

(56) References Cited

U.S. PATENT DOCUMENTS

| | | | | |
|---|---|---|---|---|
| 2018/0218275 | A1* | 8/2018 | Arrigoni | G06F 17/16 |
| 2018/0294950 | A1 | 10/2018 | Khedr | |
| 2020/0310761 | A1* | 10/2020 | Rossi | H03M 7/18 |
| 2021/0073316 | A1 | 3/2021 | Ulrich | |

OTHER PUBLICATIONS

Nedjah, et al., "A Review of Modular Multiplication Methods and Respective Hardware Implementation", Informatica, vol. 30, Jan. 2006, pp. 111-129.
Sai Chand, et al., "Implementation of High Performance Spanning Tree Adder using Quaternary Logic" International Journal of VLSI Design and Communication Systems, vol. 02, Issue 11, Dec. 2014, pp. 1186-1193.
National Institute of Standards and Technology, "Module-Lattice-based Key-Encapsulation Mechanism Standard", FIPS 204, Aug. 24, 2023, 55 pages.
Cao, et al., "A Fast Modular Reduction Method", International Association for Cryptologic Research, vol. 20140115:143728, Jan. 15, 2014, pp. 1-12.
International Search Report and Written Opinion received for PCT Application No. PCT/US2024/051676, mailed on Jan. 24, 2025, 14 pages.
Kawamura, et al., "A Fast Modular Arithmetic Algorithm Using a Residue Table", Advances in Cryptology—Eurocrypt '88 Lecture Notes in Computer Science, Springer, Berlin, DE, May 25, 1988, pp. 245-250.
Minghao, et al., "High-Speed and Low-Complexity Modular Reduction Design for CRYSTALS-Kyber", 2022 IEEE Asia Pacific Conference on Circuits and Systems (APCCAS), IEEE, Nov. 11, 2022, pp. 1-5.
Will, et al., "Computing Mod Without Mod", International Association for Cryptologic Research, vol. 20140929:083250, Sep. 28, 2014, pp. 1-18.
International Preliminary Report on Patentability Chapter 1 received for PCT Application No. PCT/US2024/051676, mailed on May 15, 2026, 08 pages.

* cited by examiner

Figure 1:
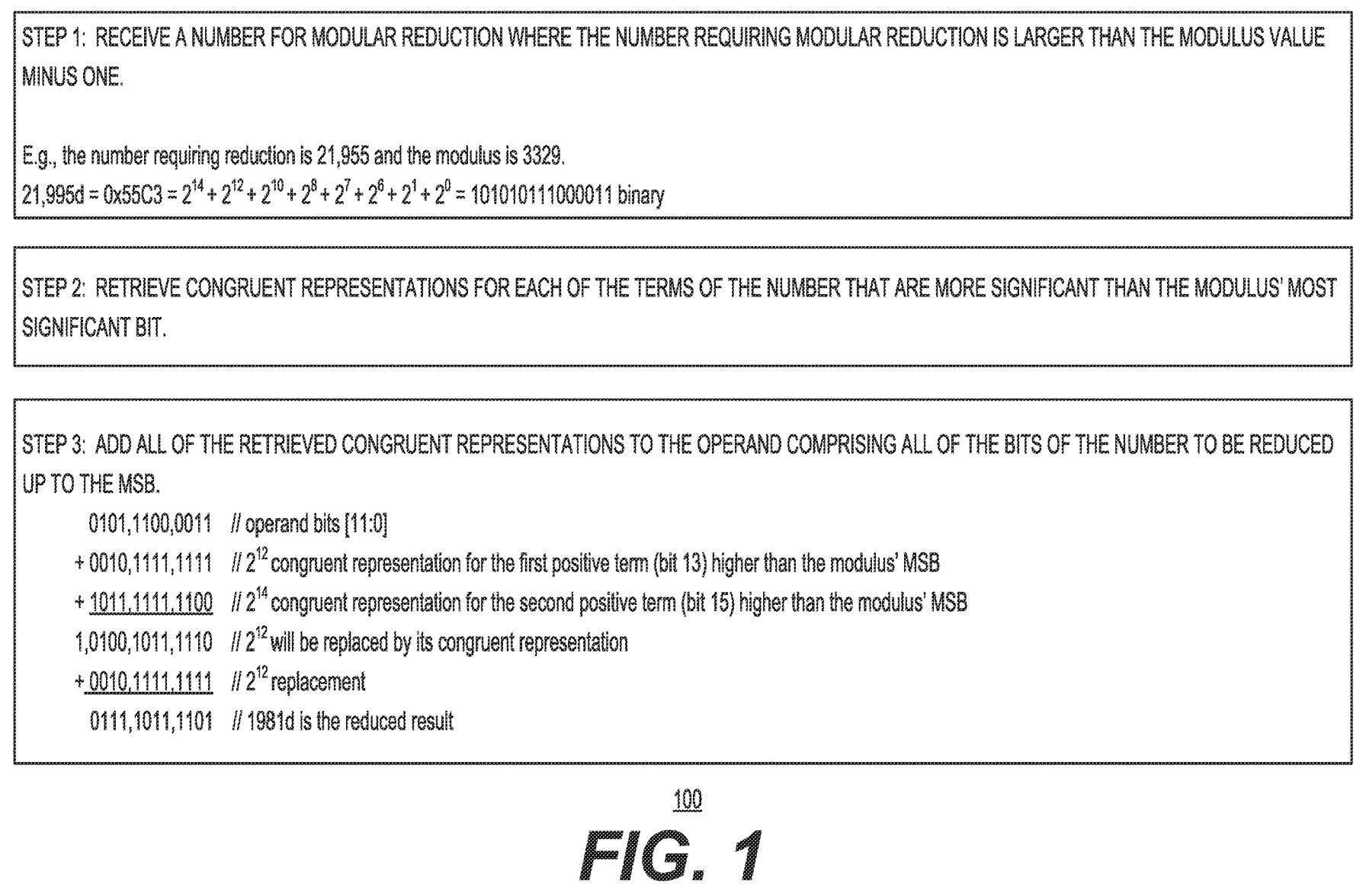

STEP 1: RECEIVE A NUMBER FOR MODULAR REDUCTION WHERE THE NUMBER REQUIRING MODULAR REDUCTION IS LARGER THAN THE MODULUS VALUE MINUS ONE.

E.g., the number requiring reduction is 21,955 and the modulus is 3329.

21,995d = 0x55C3 = $2^{14} + 2^{12} + 2^{10} + 2^{8} + 2^{7} + 2^{6} + 2^{1} + 2^{0}$ = 101010111000011 binary STEP 2: RETRIEVE CONGRUENT REPRESENTATIONS FOR EACH OF THE TERMS OF THE NUMBER THAT ARE MORE SIGNIFICANT THAN THE MODULUS' MOST SIGNIFICANT BIT.

STEP 3: ADD ALL OF THE RETRIEVED CONGRUENT REPRESENTATIONS TO THE OPERAND COMPRISING ALL OF THE BITS OF THE NUMBER TO BE REDUCED UP TO THE MSB.

0101,1100,0011 // operand bits [11:0]

\+ 0010,1111,1111 // $2^{12}$ congruent representation for the first positive term (bit 13) higher than the modulus' MSB \+ 1011,1111,1100 // $2^{14}$ congruent representation for the second positive term (bit 15) higher than the modulus' MSB 1,0100,1011,1110 // $2^{12}$ will be replaced by its congruent representation \+ 0010,1111,1111 // $2^{12}$ replacement 0111,1011,1101 // 1981d is the reduced result

```
  0101,1100,0011        // operand bits [11:0]
+ 0011,0000,0000        // 2^12 congruent elements 2^9 + 2^8 ANDed with bit 12 of the operand (one)
+ 0000,0000,0000        // 2^13 congruent elements 2^10 + 2^9 ANDed with bit 13 of the operand (zero)
+ 1100,0000,0000        // 2^14 congruent elements 2^11 + 2^10 ANDed with bit 14 of the operand (one)
+ 11,1111,1111,1001     // -2^2 - 2^1 - 2^0 or -7 sign extended
+              010      // 2^1 since bit 13 of the operand is zero
  1,0100,1011,1110      // 2^12 will be replaced by its congruent
+ 0010,1111,1111        // 2^12 replacement
  0111,1011,1101        // 1981d
```

Figure 6:
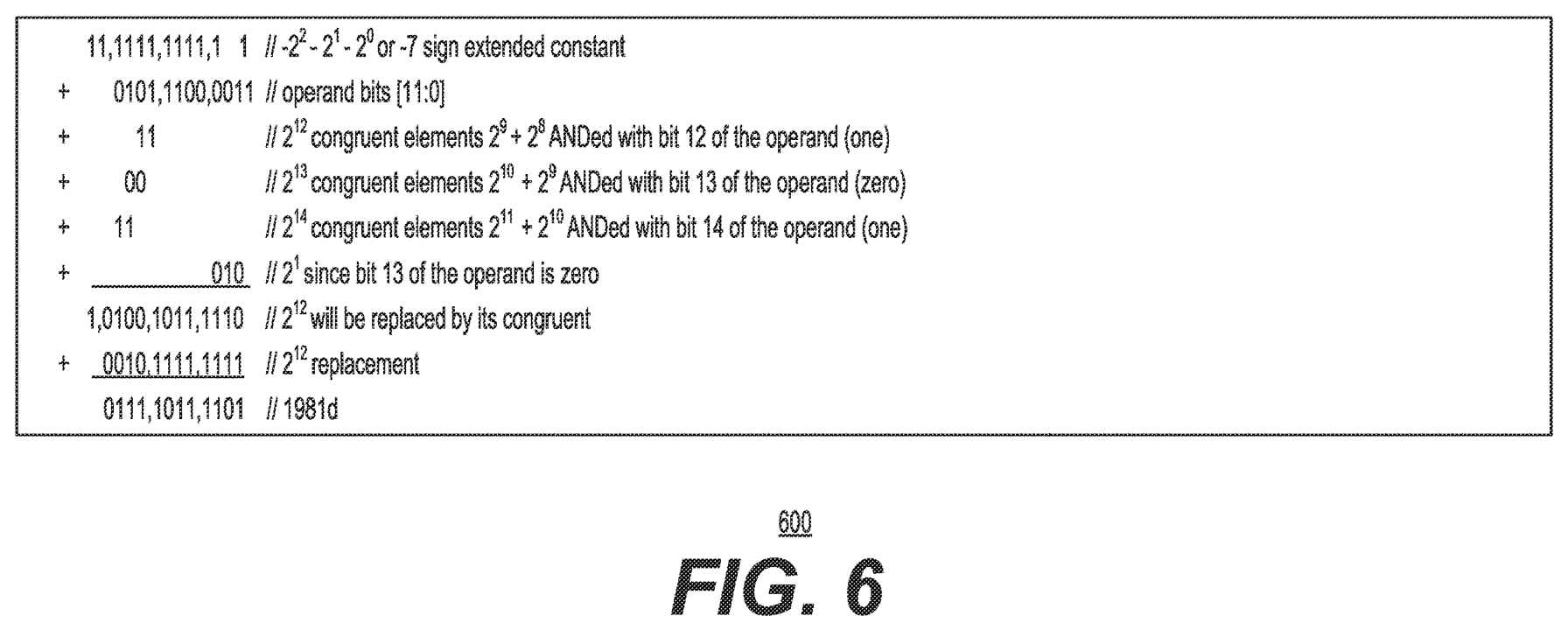

11,1111,1111,1 1 // $-2^2 - 2^1 - 2^0$ or -7 sign extended constant

\+ 0101,1100,0011 // operand bits [11:0]

\+ 11 // $2^{12}$ congruent elements $2^9 + 2^8$ ANDed with bit 12 of the operand (one)

\+ 00 // $2^{13}$ congruent elements $2^{10} + 2^9$ ANDed with bit 13 of the operand (zero)

\+ 11 // $2^{14}$ congruent elements $2^{11} + 2^{10}$ ANDed with bit 14 of the operand (one)

\+ 010 // $2^1$ since bit 13 of the operand is zero 1,0100,1011,1110 // $2^{12}$ will be replaced by its congruent \+ 0010,1111,1111 // $2^{12}$ replacement 0111,1011,1101 // 1981d

Figure 7:
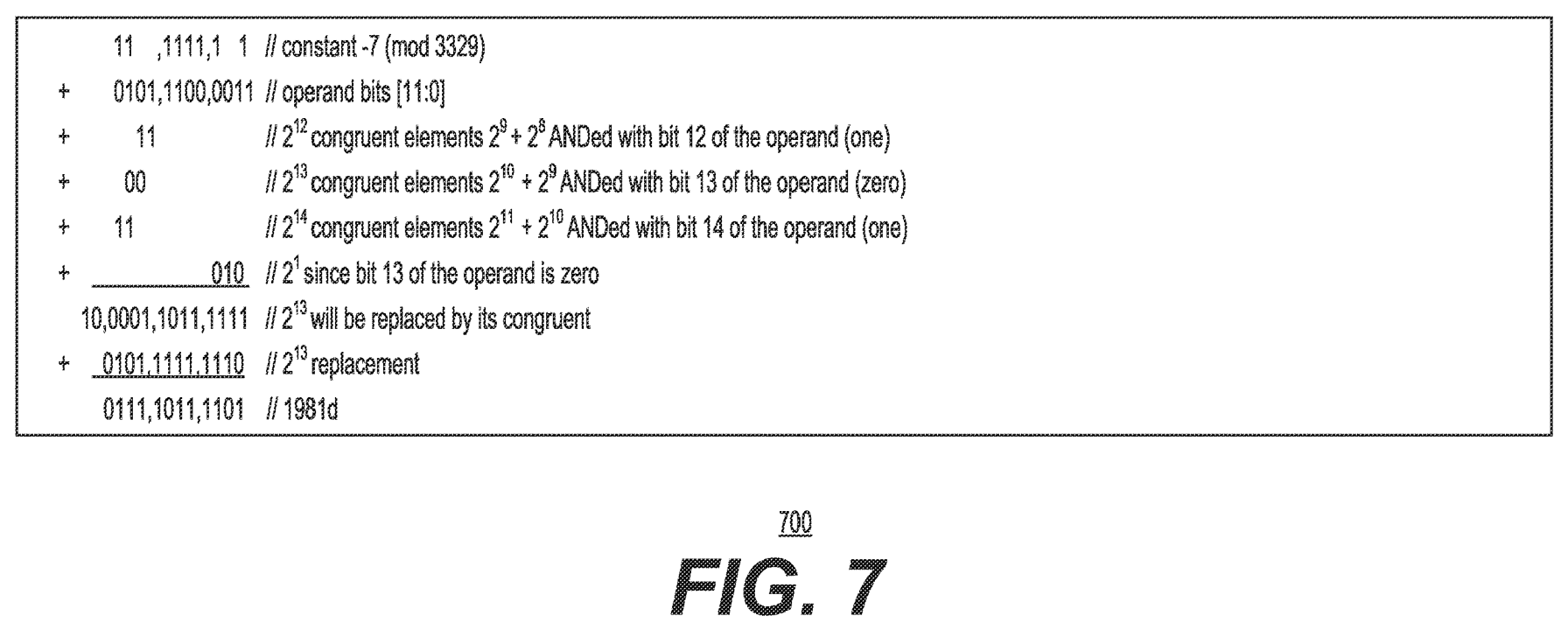

11 ,1111,1 1 // constant -7 (mod 3329)

\+ 0101,1100,0011 // operand bits [11:0]

\+ 11 // $2^{12}$ congruent elements $2^9 + 2^8$ ANDed with bit 12 of the operand (one)

\+ 00 // $2^{13}$ congruent elements $2^{10} + 2^9$ ANDed with bit 13 of the operand (zero)

\+ 11 // $2^{14}$ congruent elements $2^{11} + 2^{10}$ ANDed with bit 14 of the operand (one)

\+ 010 // $2^1$ since bit 13 of the operand is zero 10,0001,1011,1111 // $2^{13}$ will be replaced by its congruent \+ 0101,1111,1110 // $2^{13}$ replacement 0111,1011,1101 // 1981d

APPARATUS AND METHODS FOR PRIME FIELD MODULAR REDUCTION

BACKGROUND

Prime field modular reduction has been accomplished using methods such as Montgomery reduction and Barrett reduction. Montgomery reduction reduces a number from the least significant bit to the more significant bits of the number. It is well suited to very large numbers, which are larger than the unit multipliers and adders. Barret reduction reduces a number from the most significant bit to the lower significant bits. Barret reduction requires multiplying by the Barret constant, μ, with the most significant bits of the operand to be reduced. The result of this multiplication is the modular multiple which is an estimate of how many times the modulus needs to be subtracted to reduce the original unreduced operand. The modular multiple times the modulus is then subtracted from the input operand. The result of this subtraction results in a number that is nearly fully reduced. Barrett reduction requires two multiplies and one subtraction. Montgomery reduction also requires multiple multiplies and an addition.

In a hardware implementation, the multipliers consume most of the area. Accordingly, hardware implementations of both Montgomery reduction and Barrett reduction require a large amount of area of an integrated circuit. In addition, each multiplier contains a final addition, which requires a carry chain as does the subtractor. The carry chains comprise a significant portion of the latency for both Montgomery reduction and Barrett reduction. In sum, hardware implementations of both Montgomery reduction and Barrett reduction require a relatively large area, consume higher power, and have a higher latency. Accordingly, there is a need for improved apparatus and methods for modular reduction.

SUMMARY

In one example, the present disclosure relates to a custom modular reduction digital circuit for reducing an n-bit integer based on a modulus, where the modulus comprises a k-bit integer for use with a cryptographic algorithm. The custom modular reduction digital circuit may include a first circuit to generate at least two partial results by processing: (1) k lower order significant bits of the n-bit integer and (2) at least a subset of bits for congruent representations corresponding to any n-k higher order bits of the n-bit integer that are higher in significance than most significant bit of the k-bit integer. The custom modular reduction digital circuit may further include a second circuit to process the at least two partial results, output by the first circuit, to generate a reduced version of the n-bit integer for use with the cryptographic algorithm.

In another example, the present disclosure relates to a method for reducing an n-bit integer based on a modulus, where the modulus comprises a k-bit integer for use with a cryptographic algorithm. The method may include generating at least two partial results by processing: (1) k lower order significant bits of the n-bit integer and (2) at least a subset of bits for congruent representations corresponding to any n-k higher order bits of the n-bit integer that are higher in significance than most significant bit of the k-bit integer. The method may further include processing the at least two partial results to generate a reduced version of the n-bit integer for use with the cryptographic algorithm.

In yet another example, the present disclosure relates to a custom modular reduction digital circuit for reducing an n-bit integer based on a modulus, where the modulus comprises a k-bit integer for use with a cryptographic algorithm. The custom modular reduction digital circuit may include a first circuit to generate at least two partial results by processing: (1) k lower order significant bits of the n-bit integer, (2) at least a subset of bits for congruent representations corresponding to any n-k higher order bits of the n-bit integer that are higher in significance than most significant bit of the k-bit integer, and (3) a constant corresponding to any negative terms associated with the congruent representations. The custom modular reduction digital circuit may further include a second circuit to process the at least two partial results, output by the first circuit, to generate a reduced version of the n-bit integer for use with the cryptographic algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 1 shows a series of steps that can be performed as part of an example flow for performing modular reduction;

FIG. 3 shows example operations related to a hardware implementation for performing modular reduction;

FIG. 6 shows example operations related to a hardware implementation for performing modular reduction;

FIG. 7 shows example operations related to a hardware implementation for performing modular reduction.

DETAILED DESCRIPTION

Figure 2:
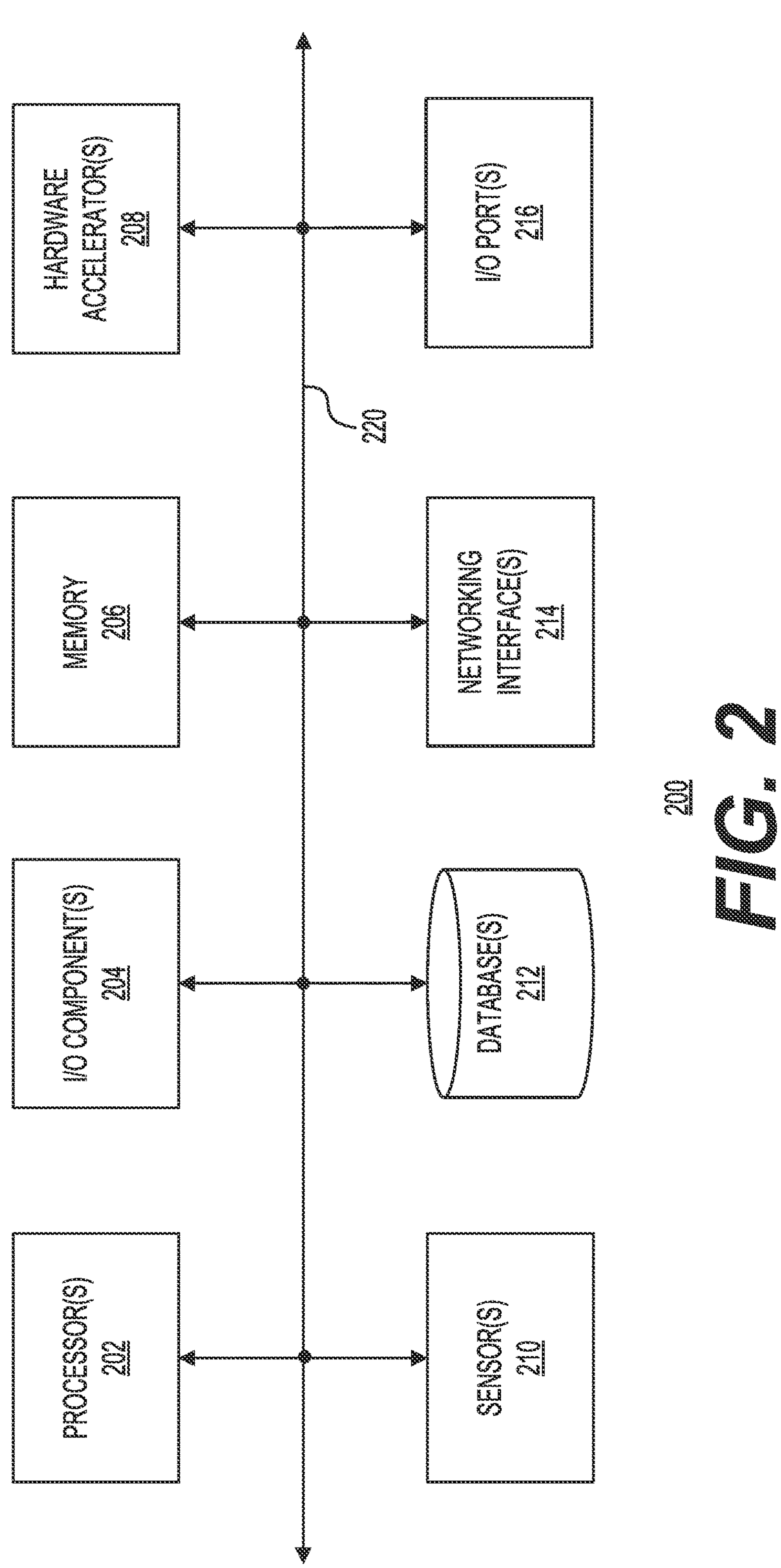
FIG. 2 shows an example computing system for performing operations, which require modular reduction.

Examples described in this disclosure relate to apparatus and methods for modular reduction. Certain examples relate to prime field modular reduction. Prime fields are mathematical finite fields based on prime numbers. Prime fields are used in Rivest-Shamir-Adleman (RSA), Elliptic Curve Cryptography (ECC), as well as in lattice-based cryptography, which is being standardized for use for quantum computer safe cryptographic algorithms by the National Institute of Standards and Technology (NIST). Prime field algorithms are also used in homomorphic encryption. Prime field arithmetic performs addition and multiplication using modular operations based on the field modulus's prime. By doing operations modulo the prime, the operation results in an element within the finite field.

ECC standards describe the prime as one of the publicly known curve domain parameters. NIST-186 documents domain parameters for several standardized ECC curves. NIST-203 and NIST-204 describe parameters, including the prime used for some "post quantum cryptography" algorithms.

Cryptography algorithms include addition and multiplication operations. After adding or multiplying, the result can end up outside the prime field range of zero to prime minus one. To bring a result back within the range of the prime field a "modular reduction" is performed. A simplistic way to modular reduce would be to repeatedly subtract the prime, or multiples of the prime, until the result is within the range of zero to prime minus one. The unreduced number is said to be congruent with the modularly reduced representation. There are other more efficient ways to perform modular reduction than repeated subtractions.

Barrett reduction is one example of an efficient modular reduction technique. With Barrett reduction the most significant bits, which include the bits that need reduction, are evaluated to get a good estimate of how many times the modulus needs to be subtracted to get the result in range. With Barrett reduction, a precomputed constant (often referred to as μ) depends only on the prime. The constant μ is multiplied by the most significant bits of the operand to be reduced to get a good estimate of the number of moduli that need to be subtracted. Thus, as part of the Barrett reduction, first the operands most significant bits are multiplied with the precomputed value μ. Then the result of the first multiply operation, which could be called the modulus multiple, is multiplied by the prime. Then, the result of the second multiply (the modulus multiple times the modulus) is subtracted from the unreduced input operand. In sum, as part of the Barrett reduction two series multiplication operations and one subtraction operation are required. Since the modular multiple is only a good estimate, one or more additional modulus may need to be subtracted or added depending on the details of the implementation.

Montgomery reduction is another often used method when very large numbers need reduction and when multiple operations are performed before the result is needed in regular format. Montgomery multiplication first converts the operands into Montgomery domain, then Montgomery multiplies are performed, then the results are transformed back into normal representation. Montgomery reduction requires multiplying the lesser significant bits of the operand by the precomputed Montgomery constant "μ" value, then multiplying the result of that multiply by the modulus, then adding that to the operand and shifting. In hardware, shifting is only a wiring connection which does not require additional logic gates. An additional subtraction of the modulus may be needed to bring the result completely within the range of zero to modulus minus one. Montgomery multiplication is often used for exponentiation because a large number of multiplications can be performed and the conversion into and out of Montgomery format can be amortized.

In sum, both Barret and Montgomery reduction require two multiplies in series, followed by an add or subtract. In a hardware implementation, the multipliers consume most of the area. Accordingly, hardware implementations of both Montgomery reduction and Barrett reduction require a large amount of area of an integrated circuit. In addition, each multiplier contains a final addition, which requires a carry chain, as does the adder or the subtractor. The carry chains comprise a good portion of the latency for both Montgomery reduction and Barrett reduction. In sum, hardware implementations of both Montgomery reduction and Barrett reduction require a relatively large area, consume higher power, and have a higher latency.

In one example, the new methods described herein are implemented in hardware using custom digital logic circuitry that can perform prime field reduction with less area and lower latency. The new apparatus and methods proposed herein are based on replacing each bit, which is higher in significance than the most significant bit of the modulus, with a congruent representation, and then adding all of the congruent representations to form the reduced result. Custom digital circuits which directly reduce an operand are constructed based on the congruences of each of the bits to be reduced. The congruent representation of each of the bits to be reduced are then summed together like partial products of a hardware multiplier. Once the partial products are summed to two terms per bit position, in a carry save Wallace tree like structure, the final two intermediate results may be added with a fast adder to produce a nearly reduced result.

In lattice-based post quantum cryptography number theoretic transforms are typically used which require many multiplies, and many adds, so a saving of area and latency for reduction yields a significant benefit. The custom modular reduction digital circuit can be fused with a traditional multiply accumulate unit. As partial results carry over to bits more significant than the prime, they can be folded back within range by replacing them with their congruent representations to be further added. So, a multiply, accumulate, and reduce unit can be built to require only one Wallace tree, and one final fast adder carry chain. The reduction in latency results in fewer clock pipeline stages, saving area and power, while improving performance.

FIG. 1 shows a series of steps that can be performed as part of an example flow 100 for performing modular reduction. Flow 100 is explained with respect to an example modulus (3,329 in decimal format) for performing modular reduction. In addition, the number requiring modular reduction is selected to be 21,955 in decimal format. Step 1 includes receiving a number for modular reduction where the number requiring modular reduction is larger than the modulus value minus one. The number for modular reduction can be generated in the context of cryptographic algorithms, as explained earlier. In the context of such algorithms, the need for modular reduction may arise at any time where a result of any multiplication, addition, or another operation results in a number that is larger than the modulus value minus one.

Modulus 3,329 corresponds to the prime modulus specified by the Federal Information Processing Standards Publication (FIPS) 203, which is entitled "Module-Lattice-Based Key-Encapsulation Mechanism Standard," and is issued by the National Institute of Standards and Technology (NIST) (referred to herein as "NIST-203"). Although the example flow 100 uses this specific prime modulus, other prime moduli may also be processed as part of the modular reduction in a similar manner. As an example, any prime modulus specified by any cryptographic algorithms, including those specified by NIST-186 and NIST-204, may be used. Moreover, in this example, although the modulus is selected to be a prime modulus, non-prime modulus can also be reduced.

In this example, the number to be reduced is 21,955, which is equal to 0x55C3 in the hexadecimal format. Moreover, the number 21,955 is equal to 101010111000011 in the binary format. Thus, in the binary format the number requiring modular reduction is 15 bits in length. The modulus is equal to 0xD01 in the hexadecimal format. Moreover, the modulus 3,329 is equal to 110100000001 in the binary format. Thus, in the binary format the reduced number will be 12 bits in length.

Step 2 includes retrieving congruent representations for each of the terms of the number (e.g., 21,955) that are more significant than the modulus' most significant bit. Bits that have a value of 1 are treated differently from the bits that have a value of 0 in the binary format. In this example, the congruent representations for only those bits that are 1 are retrieved. The congruent representations for those bits that are 0 are skipped in this respect. One of the 1 values corresponds to bit 212 of the number to be reduced and the other one of the 1 value corresponds to bit 214 of the number to be reduced. Table 1 below shows various congruent representations related example methods to obtain such congruent representations. As used herein as per the term "congruent representation," integers a and b are considered congruent modulo n if both a and b have the same remainder on division by n. Another way of viewing the congruent representation is that the congruent number does not exceed the length of the finite field corresponding to the prime modulus. Although table 1 below provides examples for modulus 3329 only, similar methods and other methods can be used for obtaining congruent representations of other moduli.

TABLE 1

| Row Number | Congruent Representation Related Example Methods | Comments |
|---|---|---|
| 1 | $0 \equiv 2^{11} + 2^{10} + 2^8 + 2^0$ | Zero is congruent with the prime number |
| 2 | $0 \equiv 2^{12} + 2^{11} + 2^9 + 2^1$ | Two times the prime number is still congruent with zero |
| 3 | $2^{12} \equiv -2^{11} - 2^9 - 2^1$ | $2^{12}$ congruence |
| 4 | $2^{12} \equiv (-2^{11} - 2^9 - 2^1) + (2^{11} + 2^{10} + 2^8 + 2^0)$ | Adding the prime number does not change the congruence |
| 5 | $2^{12} \equiv 2^{10} - 2^9 + 2^8 - 2^1 + 2^0$ | Combine terms |
| 6 | $2^{12} \equiv 2^9 + 2^8 - 2^0$ | $2^{10} - 2^9 = 2^9, -2^1 + 2^0 = -2^0$ simplified using Booth identities |
| 7 | $2^{12} \equiv 001011111111$ b | This row shows the binary representation of $2^{12}$, a congruent value |
| 8 | $2^{13} \equiv 2^{10} + 2^9 - 2^1$ | $2^{13}$ congruence (if one multiplies $2^{12}$ by 2, one gets $2^{13}$. $(2 * (2^9 + 2^8 - 2^0)) = 2^{10} + 2^9 - 2^1$. |
| 9 | $2^{14} \equiv 2^{11} + 2^{10} - 2^2$ | $2^{14}$ congruence (similar to the above row) |
| 10 | $2^{15} \equiv 2^{12} + 2^{10} - 2^2$ | $2^{12}$ is not within the finite field |
| 11 | $2^{15} \equiv (2^9 + 2^8 - 2^0) + 2^{11} - 2^3$ | Substitute the congruent representation of $2^{12}$ |
| 12 | $2^{15} \equiv 2^{11} + 2^9 + 2^8 - 2^3 - 2^0$ | $2^{15}$ congruence |

As shown in row number 1 of table 1, zero is congruent with the prime number 3329 in the decimal formant (represented as $2^{11}+2^{10}+2^8+2^0$) because if one divides the prime number by the prime number itself the result would be zero. As shown in row number 2 of table 1, two times the prime number is still congruent with the prime number because if one divides two times the prime number by the prime number, the remainder is still zero. Row number 3 of table 1 above simply shows that $2^{12}$ is moved to the left side, resulting in ($2^{12} \equiv -2^{11}-2^9-2^1$) and then both sides are made negative resulting in $2^{12}$ being congruent with $-2^{11}-2^9-2^1$. Row number 4 of table 1 above shows the addition of the prime number to the right hand side, which does not change the congruence. In other words, $2^{12}$ is congruent with $(-2^{11}-2^9-2^1)+(2^{11}+2^{10}+2^8+2^0)$ on the right hand side. Row number 5 of table 1 shows the result of combining the terms on the right hand side. Row number 6 of table 1 shows the simplification of the right hand side using Booth identities. Row number 7 of table 1 shows the binary representation (001011111111 b) of the congruent representation of $2^{12}$.

Row number 8 of table 1 shows the congruent representation $2^{13}$ because if one multiplies $2^{12}$ by 2, one gets $2^{13}$ $(2*(2^9+2^8-2^0)=2^{10}+2^9-2^1)$. Using a similar method, row number 9 of table 1 shows the congruent representation for $2^{14}$. Row numbers 10, 11, and 12 of table 1 show the steps involved in obtaining the congruent representation for $2^{15}$, which is $2^{11}+2^9+2^8-2^3-2^0$. Although table 1 shows congruent representations and related methods for a 15-bit number, using similar methods congruent representations can be obtained for larger numbers. As an example, multiplying one at a time by two (e.g., as shown in table 1 with respect to $2^{13}$, $2^{14}$, and $2^{15}$) is one way of obtaining congruent representations for the larger numbers. Table 2 below shows additional congruent representations for certain higher order terms.

TABLE 2

| |
|---|
| $2^{15} \equiv 2^{12} + 2^{11} - 2^3 = (2^9 + 2^8 - 2^0) + 2^{11} - 2^3 = 2^{11} + 2^9 + 28 - 2^3 - 2^0$ |
| $2^{16} \equiv 2^{12} + 2^{10} + 2^9 - 2^4 - 2^1 = (2^9 + 2^8 - 2^0) + 2^{10} - 2^9 - 2^4 - 2^1$ |
| $2^{16} \equiv 2^{10} + 2 \cdot 2^9 + 2^8 - 2^4 - 2^1 - 2^0 = 2^{10} + 2^{10} + 2^8 - 2^4 - 2^1 - 2^0 = 2^{11} + 2^8 - 2^4 - 2^1 - 2^0 = 2^{11} + 2^8 - 2^4 - 2^2 + 2^0$ |
| $2^{17} \equiv 2^{12} + 2^9 - 2^5 - 2^3 + 2^1 = (2^9 + 2^8 - 2^0) + 2^9 - 2^5 - 2^3 + 2^1 = 2^{10} + 2^8 - 2^5 - 2^3 + 2^1 - 2^0 = 2^{10} + 2^8 - 2^5 - 2^4 + 2^3 + 2^0$ |
| $2^{17} \equiv 2^{10} + 2^8 - 2^6 + 2^4 + 2^3 + 2^0 = 2^{10} + 2^7 + 2^6 + 2^4 + 2^3 + 2^0$ |
| $2^{18} \equiv 2^{11} + 2^8 + 2^7 + 2^5 + 2^4 + 2^1$ |
| $2^{19} \equiv 2^{10} + 2^9 + 2^6 + 2^5 + 2^1 + 2^0$ |
| $2^{20} \equiv 2^{11} + 2^{10} + 2^7 + 2^6 + 2^2 + 2^1$ |
| $2^{21} \equiv 2^{11} + 2^{10} + 2^7 + 2^3 + 2^1 + 2^0$ |
| $2^{22} \equiv 2^{11} + 2^{10} + 2^4 + 2^2 + 2^0$ |
| $2^{23} \equiv 2^{11} + 2^9 + 2^8 + 2^5 + 2^3 + 2^0$ |
| $2^{24} \equiv 2^{11} + 2^8 + 2^6 + 2^4 + 2^0$ |
| $2^{25} \equiv 2^{10} + 2^8 + 2^7 + 2^5 + 2^0$ |
| $2^{26} \equiv 2^{11} + 2^9 + 2^8 + 2^6 + 2^1$ |
| $2^{27} \equiv 2^{11} + 2^8 + 2^7 + 2^1 + 2^0$ |

As explained later, congruent representations can be expressed in a concise manner to take advantage of the optimizations in hardware implementations. In the case of the software implementation of modular reduction, the precomputed congruent representations for a given modulus can be stored in tables (e.g., lookup tables) for use in the next step.

Still referring to FIG. 1, step 3 includes adding all of the retrieved congruent representations to the operand comprising all of the bits of the number to be reduced up to the MSB. In this example, these 12 bits are: 0101,1100,0011. As shown as part of step 3 in FIG. 1, the retrieved congruent representation of $2^{12}$ corresponding to bit position 13 and the retrieved congruent representation of $2^{14}$ corresponding to bit position 15 are added to the relevant 12 operand bits (11:0). Depending on the type of processor being used, the addition operations can be performed using the arithmetic logic unit or another such logic unit. As shown in FIG. 1, as part of step 3, the result of the addition operations overflows into the bit position 13. To address this overflow, the retrieved congruent representation of $2^{12}$ corresponding to bit position 13 is added again to generate the reduced result (1981d). The bit corresponding to $2^{12}$ is replaced by its congruent representation. The reduced result in binary format is 0111,1011,1101. The reduced result in hexadecimal format is 0x7BD, which is 1981 in decimal format, which is 21955 (mod 3328).

FIG. 2 shows an example computing system 200 for performing operations, which require modular reduction. Computing system 200 may be a distributed computing system including components housed in data centers, on customers' premises, or any other location. As an example, computing system 200 is used to implement any application requiring encryption/decryption, which further requires modular reduction, as described herein. Computing system 200 includes a processor(s) 202, I/O component(s) 204, a memory 206, hardware accelerator(s) 208, sensors 210, database(s) 212, networking interfaces 214, and I/O port(s) 216, which may be interconnected via bus 220. Processor(s) 202 may execute instructions stored in memory 206 or any other instructions received via a wired or a wireless connection. The processor(s) 202 may include CPUs, GPUs, Application-Specific Integrated Circuits (ASICs), Field-Programmable Gate Arrays (FPGAs), or other types of logic configured to execute instructions. I/O component(s) 204 may include components such as a keyboard, a mouse, a voice recognition processor, or touch screens. Memory 206 may be any combination of non-volatile storage or volatile storage (e.g., flash memory, DRAM, SRAM, or other types of memories). Hardware accelerator(s) 208 may include specialized hardware acceleration engines for accelerating different aspects associated with computing system 200. Sensor(s) 210 may include telemetry or other types of sensors configured to detect, and/or receive, information (e.g., conditions associated with the various devices in a data center). Sensor(s) 210 may include sensors configured to sense conditions associated with CPUs, memory or other storage components, FPGAs, motherboards, baseboard management controllers, or the like.

Still referring to FIG. 2, database(s) 212 may be used to store any of the data or files (e.g., metadata store or other datasets). Database(s) 212 may be implemented as a collection of distributed databases or as a single database. Network interface(s) 214 may include communication interfaces, such as Ethernet, cellular radio, Bluetooth radio, UWB radio, or other types of wireless or wired communication interfaces. I/O port(s) 216 may include Ethernet ports, Fiber-optic ports, wireless ports, or other communication ports.

Instructions for enabling various systems, components, devices, methods, services, and terminals may be stored in memory 206 or another memory. These instructions when executed by one or more of processor(s) 202, or other processors, may provide the functionality associated with the methods described in this disclosure. As an example, instructions for performing the steps shown in FIG. 1 may be stored in memory 206. The instructions when executed may provide the functionality for modular reduction, as described earlier with respect to FIG. 1. The instructions could be encoded as hardware corresponding to a processor or a field programmable gate array. Other types of hardware such as ASICs and GPUs may also be used. Although FIG. 2 shows computing system 200 as including a certain number of components arranged and coupled in a certain way, it may include fewer or additional components arranged and coupled differently. In addition, the functionality associated with computing system 200 may be distributed or combined, as needed.

FIG. 3 shows example operations 300 related to a hardware implementation for performing modular reduction. Like before the lower bits up to the MSB of the modulus, in this case 12 bits, are summed to the congruent representations of any terms that correspond to the higher order bits (e.g., bits 13 to 15 in this case). Instead of placing the entire congruent representation of $2^{12}$, $2^{13}$, and $2^{14}$ in the summation table, only the congruent representations for the positive coefficients are included in the summation table. The partial summations are subjected to a logical AND operation with the corresponding bits of the number being reduced that are larger than the MSB of the modulus to be able to reduce any pattern which contains 15 bits of data, regardless of whether each bit is zero or one.

To complete the summation of the congruent representations, the negative terms of the congruent representations need to be added. Instead of adding each of the negative terms ($-2^2-2^1-2^0$) separately, the sum of the negative terms (−7 sign extended or 1111,1111,1001 in binary) is precomputed and then added to the congruent representations to the positive coefficients. In this example, operand bit 13 is zero so $2^1$ should not have been subtracted from the summation. To compensate for the operand bit 13 being zero and, thus, it being incorrectly subtracted in the summation earlier, operand bit 13 is inverted, and it is placed in the summation position $2^1$. To ensure that any pattern of the operand (e.g., the number being reduced) is properly computed, the operand bits 12 and 14 are also inverted and placed in positions $2^0$ and $2^2$.

Figure 4:
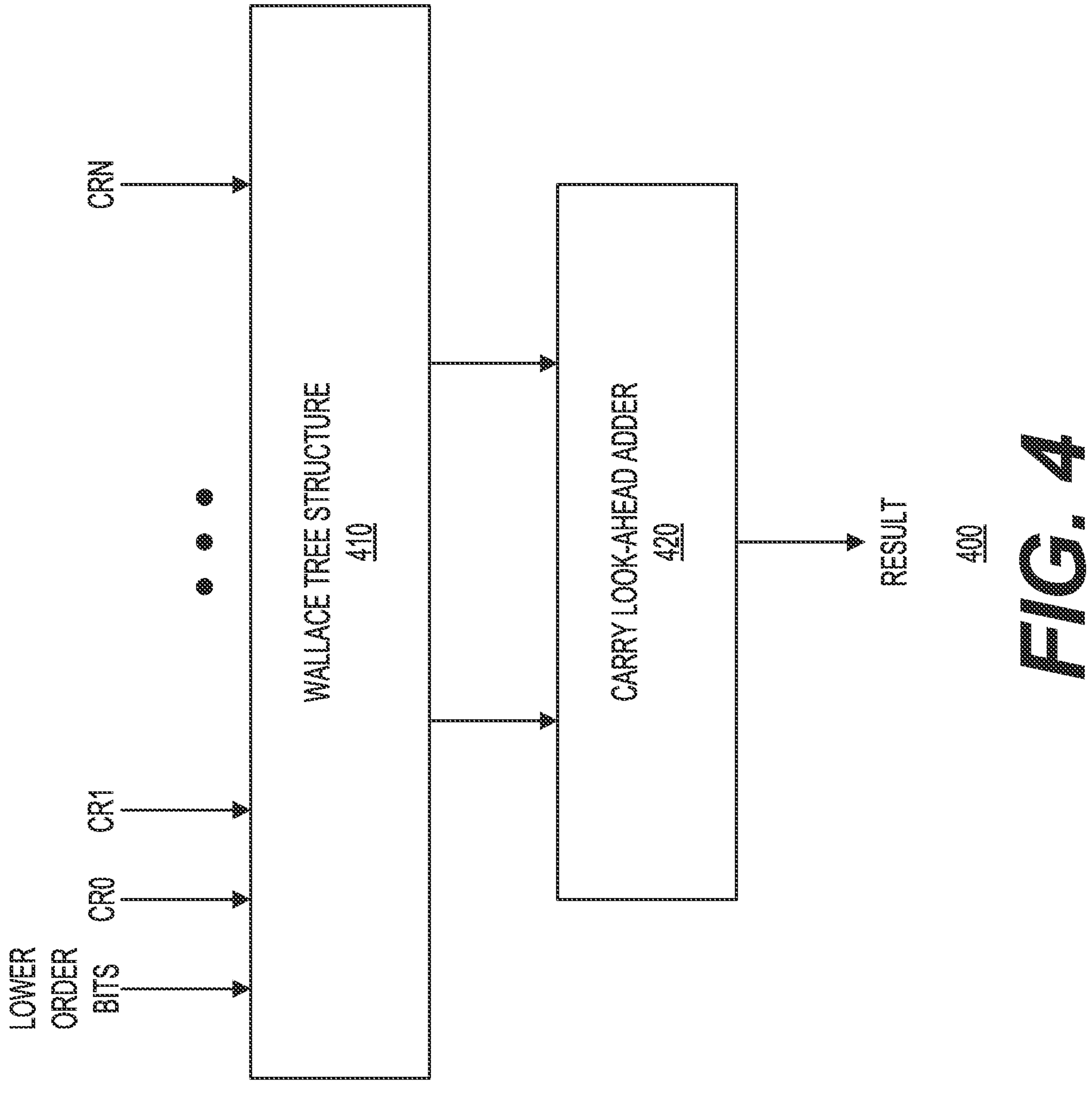
FIG. 4 shows an example custom modular reduction digital circuit.

FIG. 4 shows an example custom modular reduction digital circuit 400. Custom modular reduction digital circuit 400 is an example hardware implementation for performing the operations 300 of FIG. 3. Custom modular reduction digital circuit 400 includes wires carrying values for the congruent representations (CR0, CR1, . . . . CRN) and the lower significant bits (LOWER ORDER BITS, e.g., 11:0 operand bits). Custom modular reduction digital circuit 400 further includes a Wallace tree structure 410 and a carry look-ahead adder 420. Wallace tree structure 410 is used to reduce the number of partials (e.g., the inputs to Wallace tree structure 410) down to two and the carry look-ahead adder 420 is used to perform the final addition of the carry save format components. Such efficient structures can be implemented by accessing cell libraries comprising full-adder cells, half-adder cells, logic gates, and inverters and organizing them for performing the various operations. The network of cells can be engineered/interconnected to efficiently implement the operations described with respect to FIG. 3.

In addition, the congruent representations (CR0, CR1, . . . . CRN), and other terms before being presented to the Wallace tree structure 410 can be further optimized, as described later with respect to the optimizations to the hardware implementation operations 300 shown in FIG. 3. The constant term (e.g., −7 sign extended) can be replaced by its congruent representation by adding the modulus to it. The folded congruent representations along with the congruent representation of all the precomputed constants can be then summed using the Wallace tree structure 410. Thus, a digital-logic network specific to the modulus (e.g., modulus 3329) is constructed to efficiently perform the reduction. Although FIG. 4 shows custom modular reduction digital circuit 400 as having certain components that are arranged in a certain manner, custom modular reduction digital circuit 400 can include additional or fewer components that are arranged differently. As an example, instead of the Wallace tree structure 410, other types of trees, including Dadda trees, may be used. Moreover, instead of tree-type structures, other types of structures may also be used.

Even with a Wallace tree structure followed by a final carry look-ahead adder, the final adder can result in an extra carry-out bit above its two inputs. Accordingly, reduction could result in one extra bit that would need to be further reduced to get a result completely in the range of the prime field. This is not unlike the case with Barrett reduction and Montgomery reduction, which also require some extra reduction to ensure the result is completely within the range of the finite field. Also, the result could have the correct number of bits, but the magnitude could exceed or equal the modulus.

The same, or similar, reduction structures and methods described herein can also be applied to the addition of two unreduced operands or two reduced operands. As an example, often multiple additions need to be performed in a prime finite field. After multiple non-reducing additions are performed, which would result in some bit growth, the result can be reduced using the example methods and structures described herein. Alternatively, the multiple additions could be performed simultaneously while also performing the modular reduction as described herein. If three items are to be added, the three items can be term reduced using a 3:2 type full adder term reduction. The carry-out of a full adder when crossing the modulus MSB boundary can be folded down within range using the congruent representations-related methods described previously. A fast three input adder has an increased latency of only one full adder cell, which results in an increased area equivalent to only a ripple adder. Adding multiple terms at the same time improves both area and latency. If more than three terms need to be added, it is advantageous to perform all of the summations in the same network. If the adds need to be reduced then the reduction can take advantage of being combined using the same structure. Any number of addition operations and modular reductions can be performed within a single term reduction tree and a single look-ahead adder. Much of the latency is consumed in the look-ahead adder, thus, by combining adds and modular reduction using the methods and structures described herein the number of series look-ahead adders can be minimized.

Similarly multiply operations and modular reduction can be combined by taking advantage of a single term reduction tree and by using a single look-ahead adder. In certain examples, multiply, add, and modular reduction can also use the same structure. Likewise multiplies with multiple accumulates and modular reduction can all be combined using one tree add and reduce structure followed by a fast look-ahead adder. When multiplying and reducing it is advantageous to reduce the number of partials before folding them back with a congruent replacement. A typical congruent replacement for a single bit has two or more bits. A typical 3:2 partial reduction uses a full adder cell which takes in three input terms and has two outputs terms. Thus, reducing the number of terms before replacing them with the congruent representations is a good strategy. If latency is not a concern the partials can be reduced to minimum using ripple adder techniques. This implementation would result in a smaller area, but higher latency. Other multiplier architecture techniques including modified Booth encoding can also be used in concert with the modular reduction techniques described here. As an example, Booth encoding can be used to reduce the number of partials prior to further processing.

The digital-network circuit specific to a modulus (e.g., custom modular reduction digital circuit 400) can be integrated with any type of prime field-arithmetic being performed in the context of encryption/decryption, including homomorphic encryption. Homomorphic and lattice-based encryption relies upon multiplication of very large degree polynomials in finite fields. Number theoretic transform (NTT) accelerates polynomial multiplication significantly and, thus, it is the core arithmetic operation in many homomorphic encryption schemes. After multiplying as in the NTT techniques, the result range would be outside the prime field range of zero to prime minus one. To bring the result back within the range of the prime field, prime modular reduction can be performed using the hardware implementation described with respect to FIGS. 3 and 4. In sum, the custom modular reduction digital circuit 400 can be integrated within the NTT scheme. This integration is useful because otherwise every multiply operation doubles the number of bits that require processing.

Figure 5:
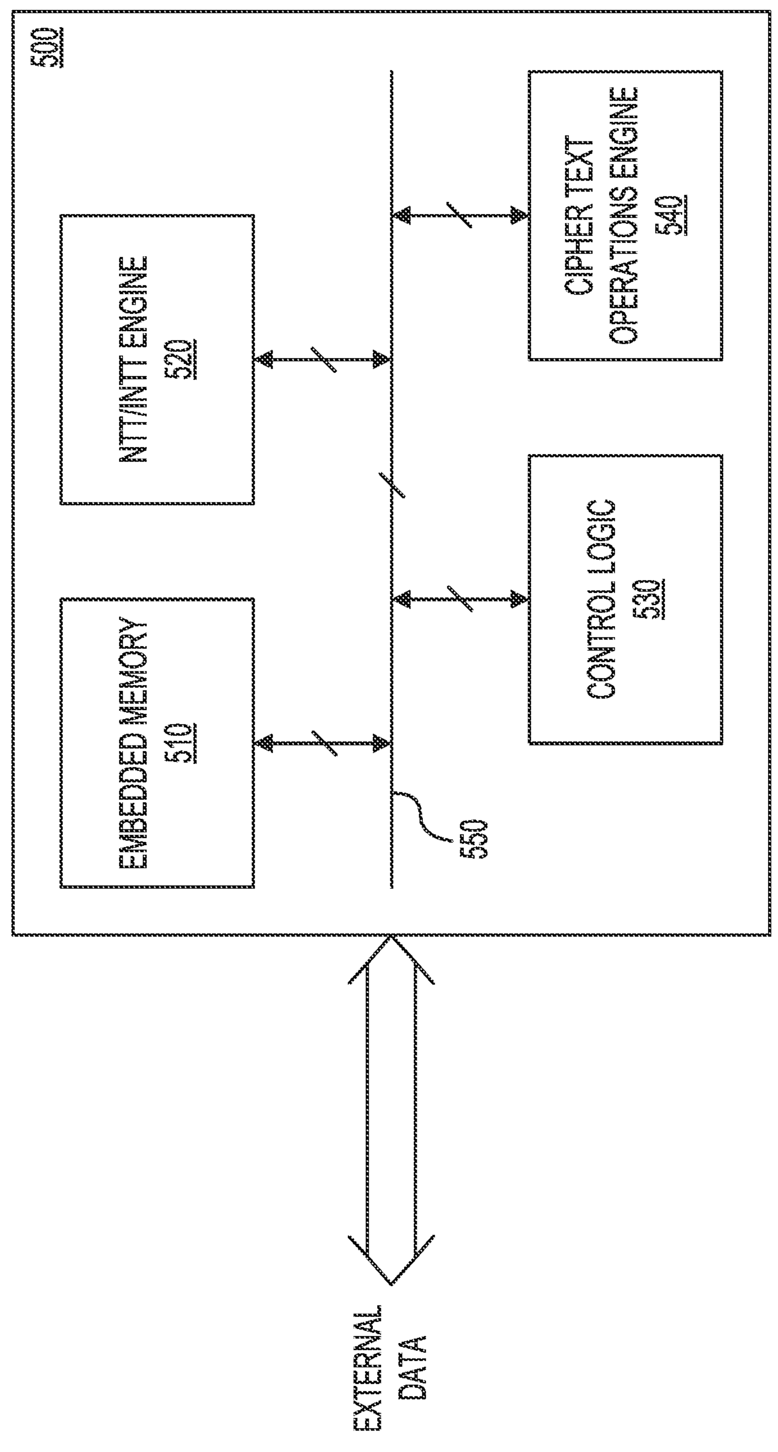
FIG. 5 shows an example encryption unit that can include the custom modular reduction digital circuit for prime modular reduction.

FIG. 5 shows an example encryption unit 500 that can include custom modular reduction digital circuits for prime modular reduction. Encryption unit 500 can be configured to perform lattice-based post quantum cryptographic operations, including homomorphic encryption. Homomorphic encryption allows a computing system to perform operations on encrypted data without decrypting it. Thus, encryption unit 500 can be included as part of a computing system acting as a server in a cloud computing environment, allowing the server to perform operations using the encrypted data. As an example, encryption unit 500 can be implemented as a hardware accelerator (e.g., hardware accelerator(s) 208 of computing system 200 of FIG. 2). Unencrypted data from external memory can be processed using encryption unit 500 included in the computing system (e.g., as part of a hardware accelerator). In this example, encryption unit 500 includes embedded memory 510, a number theoretic transform (NTT)/Inverse number theoretic transform (INTT) engine 520, control logic 530, and a ciphertext operations engine 540, which are coupled with each other using bus 550. Embedded memory 510 is used to store data internal to encryption unit 500.

With continued reference to FIG. 5, control logic 530 includes various control circuits, including finite state machines and other programmed logic to control certain aspects of encryption unit 500. NTT/INTT engine 520 responds to control logic 530 such that it can operate in a mode that corresponds to the specific modulus being used as part of encryption unit 500. NTT/INTT engine 520 can include butterfly units for performing coefficient wise polynomial multiplications and related operations. The NTT portion of the NTT/INTT engine 520 is configured to transform ciphertexts into number theoretic transforms (NTTs) and the INTT portion of the NTT/INTT engine 520 is configured to transform the NTTs back into ciphertexts. As explained earlier, NTT/INTT operations include polynomial multiplications. After the operations performed using NTT/INTT engine 520, the result could be outside the prime field range of zero to prime minus one. To bring the result back within the range of the prime field, modular reduction can be performed using the methods and circuits described herein. The prime modular reduction is performed using the custom digital network (e.g., custom modular reduction digital circuit 400) for a specific prime modulus (e.g., prime modulus 3,329 described earlier). The custom digital network-based modular reduction can be included in any place within the encryption unit, where a multiplication or an addition operation generates a result outside the prime field range of zero to prime minus one. Advantageously, having the custom digital network perform the prime modular reduction lowers the latency, resulting in fewer clocked pipeline stages, saving area and power, while improving performance.

Ciphertext operations engine 540 includes logic to enable the performance of additional operations for encryption unit 500, including when configured as a lattice-based post-quantum cryptographic unit. As an example, ciphertext operations engine 540 can be configured to perform different types of operations including additions, subtractions, multiplications, exclusive-OR operations, exclusive-NOR operations, logical-AND operations, logical-NOR operations, and other operations required for the processing of the ciphertext. The custom digital network-based modular reduction can be included in any place within the ciphertext operations engine 540. Although FIG. 5 shows a certain number of components of encryption unit 500 arranged in a certain manner, there could be more or fewer number of components of encryption unit 500 arranged differently. As an example, some or all of the functionalities described as part of NTT/INTT engine 520 and ciphertext operations engine 540 could be combined. In addition, the components described with respect to encryption unit 500 can also be included in a lattice-based post-quantum cryptographic unit to take advantage of the custom modular reduction digital circuits for prime modular reduction.

FIG. 6 shows example operations 600 related to a hardware implementation for performing modular reduction. As larger operands (e.g., the number to be reduced) are operated on, more bits need to be reduced, as a consequence the number of terms grows. The negative terms can be precomputed and added (e.g., as shown in the top row of operations 600). Moreover, not all the bits for the congruent representations and constants need to be included in the summation network. Accordingly, as part of operations 600, the constant zero terms have been replaced with white space to show that only the terms that contribute to the summation network need to be processed. As a result of this optimization, fewer terms need to be summed than the number of terms being summed shown as part of operations 300 of FIG. 3. The operand bits, the congruent representations, and the negative terms can be processed using a similar circuit to the custom modular reduction digital circuit 400 of FIG. 4.

FIG. 7 shows example operations 700 related to a hardware implementation for performing modular reduction. As part of this optimization, as shown as part of the top row of operations 700, the negative terms can be precomputed and added as a constant. Thus, in this example, the −7 term can be replaced by its modular equivalent which is −7+3,329, or 3,322 in the decimal format, or CFA in the hexadecimal format. Adding constants enables logic optimizations which other variable signals do not allow. This is because even though many of the terms above are from the constant, they do not contribute as much to the area and the latency as the other variable terms. As more terms are added, the constants can be combined at design time and only one constant will exist in the summation, making the constant a decreasing percentage of the logic. As the number of terms to be reduced grows, the difference these optimizations makes increases.

Although operations 600 of FIG. 6 and operations 700 of FIG. 7 are shown as a series of addition operations, as described earlier with respect to FIG. 4, Wallace tree like structures and a carry look-ahead adder can be used to implement the custom modular reduction digital circuits. The depth of the tree (e.g., the Wallace tree) depends on how many terms are in each bit position. As can be seen from operations 700 of FIG. 7, the depth of terms in each bit position is smaller than the total number of terms in the other less optimized versions of the operations shown in FIG. 3.

In addition, the operations 600 of FIG. 6 and operations 700 of FIG. 7 can be further improved in terms of processing by a custom modular reduction digital circuit (e.g., custom modular reduction digital circuit 400 of FIG. 4). In each of the set of operations shown in FIG. 6 and FIG. 7, the summation produces either a $2^{12}$ or a $2^{13}$ term, which is later replaced by its respective congruent representation. When the summation is performed in a Wallace tree like structure, each full adder cell can add three bits and produce a sum and a carry-out. The sum will have the same significance as the inputs, but the carry-out will be one bit more significant. The carry-out can cross the boundary in a manner that is more significant than the most significant bit of the modulus. Accordingly, the carry-out signal of a full adder cell can be used to inject the congruent back into the tree of terms being added. Also, since during the construction of the Wallace tree structure as part of the custom modular reduction digital circuit, it will be known that there will be a carry being folded back into the addition tree, the negative terms of that folded term can be added to the precomputed constant. Hence the carry-out that crosses the boundary would add back in the positive terms of that congruent, and the inverse of that carry-out would add the terms associated with the negative term(s) of the congruent since it/they would be pre-subtracted much like shown above in the other terms. In the operations example shown in FIG. 1, the $2^{12}$ term and the $2^{14}$ term is being replaced by a less succinct congruent representation. However, if the term replacement is anticipated during the construction of the custom modular reduction digital circuit, the constant can be adjusted, and the more succinct congruent representation used in FIG. 7 can be used.

Figure 8:
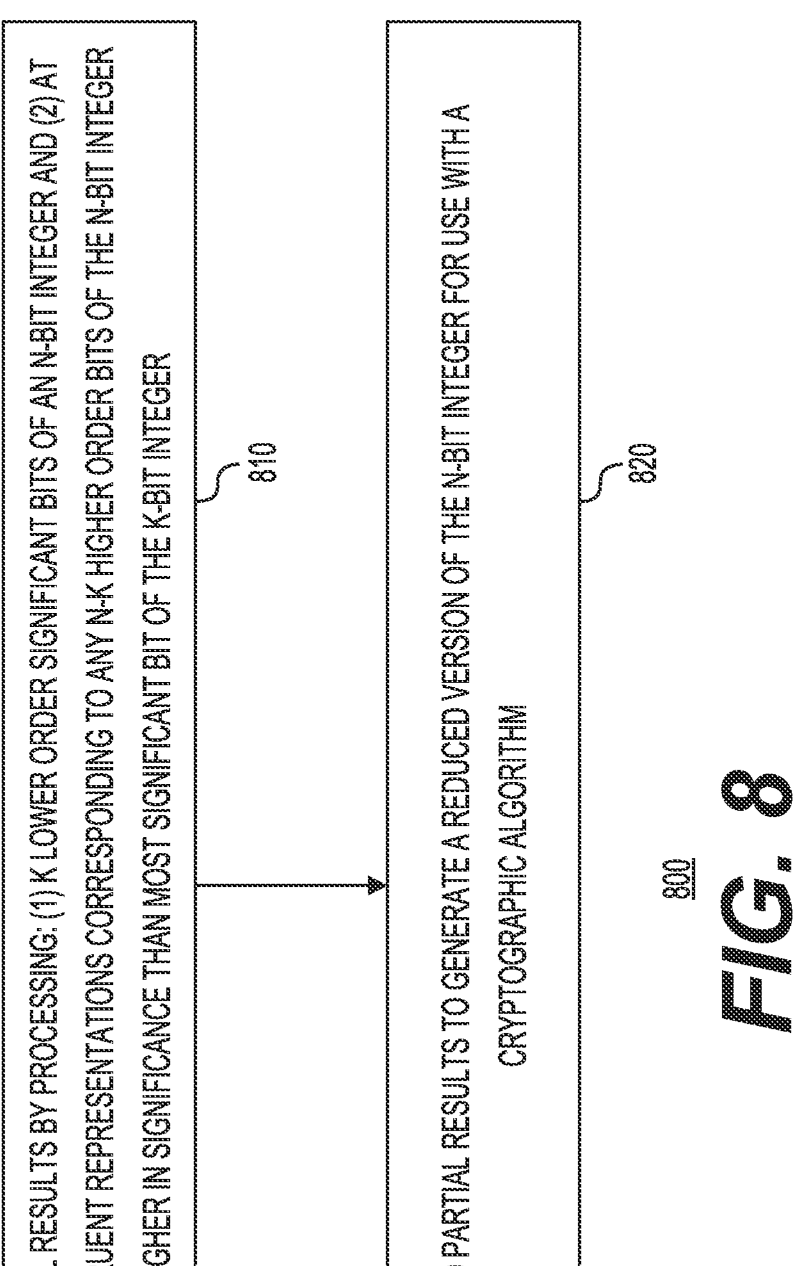
FIG. 8 shows a flow chart of a method for reducing an n-bit integer based on a modulus, where the modulus comprises a k-bit integer for use with a cryptographic algorithm in accordance with one example.

FIG. 8 shows a flow chart 800 of a method for reducing an n-bit integer based on a modulus, where the modulus comprises a k-bit integer for use with a cryptographic algorithm in accordance with one example. Step 810 includes generating at least two partial results by processing: (1) k lower order significant bits of the n-bit integer and (2) at least a subset of bits for congruent representations corresponding to any n-k higher order bits of the n-bit integer that are higher in significance than the most significant bit of the k-bit integer. As an example, step 810 can be performed using circuit(s) associated with the custom modular reduction digital circuit 400 of FIG. 4. Alternatively, software instructions programmed to implement these steps can also be used.

Specifically, in one example, step 810 can be performed by Wallace tree structure 410 of FIG. 4. Alternative structures similar to Wallace tree structure 410 can also be used for performing this step. As an example, a Dadda tree structure can be used for performing this step. The generation of the at least two partial results comprises summing the k lower order significant bits of the n-bit integer with the subset of the bits for congruent representations corresponding to any n-k higher order bits of the n-bit integer that are higher in significance than the most significant bit of the k-bit integer. The summing of the bits can result in a formation of intermediate partial results with one or more carryover bits having a higher significance than the most significant bit of the k-bit modulus integer. The method includes folding back any such formed intermediate partial results by replacing them with respective congruent representations for further processing.

Step 820 includes processing the at least two partial results to generate a reduced version of the n-bit integer for use with the cryptographic algorithm. As an example, step 820 can be performed using circuit(s) associated with the custom modular reduction digital circuit 400 of FIG. 4. Specifically, in one example, step 820 can be performed by carry look-ahead adder 420 of FIG. 4. Alternative structures, similar to carry look-ahead adder 420 can also be used for performing this step. Alternatively, software instructions programmed to implement these steps can also be used. Although FIG. 8 describes a certain number of steps performed in a certain order, flow chart 800 may include additional steps.

In conclusion, the present disclosure relates to a custom modular reduction digital circuit for reducing an n-bit integer based on a modulus, where the modulus comprises a k-bit integer for use with a cryptographic algorithm. The custom modular reduction digital circuit may include a first circuit to generate at least two partial results by processing: (1) k lower order significant bits of the n-bit integer and (2) at least a subset of bits for congruent representations corresponding to any n-k higher order bits of the n-bit integer that are higher in significance than most significant bit of the k-bit integer. The custom modular reduction digital circuit may further include a second circuit to process the at least two partial results, output by the first circuit, to generate a reduced version of the n-bit integer for use with the cryptographic algorithm.

The generation of the at least two partial results may comprise summing the k lower order significant bits of the n-bit integer with the subset of the bits for congruent representations corresponding to any n-k higher order bits of the n-bit integer that are higher in significance than the most significant bit of the k-bit integer. The summing results in a formation of intermediate partial results with a carryover bit having a higher significance than the most significant bit of the k-bit integer, and where the first circuit is to fold back any such formed intermediate partial results by replacing them with respective congruent representations for further processing.

The first circuit may comprise a structure corresponding to a Wallace tree or a Dadda tree. The second circuit may comprise a carry look-ahead adder. The cryptographic algorithm may use only a specific prime modulus, and the modulus comprises the specific prime modulus. The encryption algorithm may be one of a Rivest-Shamir-Adleman (RSA) algorithm, an Elliptic Curve Cryptography (ECC), or a lattice-based cryptography algorithm.

In another example, the present disclosure relates to a method for reducing an n-bit integer based on a modulus, where the modulus comprises a k-bit integer for use with a cryptographic algorithm. The method may include generating at least two partial results by processing: (1) k lower order significant bits of the n-bit integer and (2) at least a subset of bits for congruent representations corresponding to any n-k higher order bits of the n-bit integer that are higher in significance than most significant bit of the k-bit integer. The method may further include processing the at least two partial results to generate a reduced version of the n-bit integer for use with the cryptographic algorithm.

The generating the at least two partial results comprises summing the k lower order significant bits of the n-bit integer with the subset of the bits for congruent representations corresponding to any n-k higher order bits of the n-bit integer that are higher in significance than the most significant bit of the k-bit integer. The summing results in a formation of intermediate partial results with a carryover bit having a higher significance than the most significant bit of the k-bit integer, and the method may further comprise folding back any such formed intermediate partial results by replacing them with respective congruent representations for further processing.

The cryptographic algorithm may use only a specific prime modulus, and the modulus comprises the specific prime modulus. The method may further comprise pre-computing the congruent representations and storing them in one or more lookup tables. The method may further include prior to generating the at least two partial results, retrieving the congruent representations from the one or more lookup tables.

In yet another example, the present disclosure relates to a custom modular reduction digital circuit for reducing an n-bit integer based on a modulus, where the modulus comprises a k-bit integer for use with a cryptographic algorithm. The custom modular reduction digital circuit may include a first circuit to generate at least two partial results by processing: (1) k lower order significant bits of the n-bit integer, (2) at least a subset of bits for congruent representations corresponding to any n-k higher order bits of the n-bit integer that are higher in significance than most significant bit of the k-bit integer, and (3) a constant corresponding to any negative terms associated with the congruent representations. The custom modular reduction digital circuit may further include a second circuit to process the at least two partial results, output by the first circuit, to generate a reduced version of the n-bit integer for use with the cryptographic algorithm.

The generation of the at least two partial results comprises summing the k lower order significant bits of the n-bit integer, the subset of the bits for the congruent representations corresponding to any n-k higher order bits of the n-bit integer that are higher in significance than the most significant bit of the k-bit integer, and the constant corresponding to any negative terms associated with the congruent representations. The summing results in a formation of intermediate partial results with a carryover bit having a higher significance than the most significant bit of the k-bit integer, and the first circuit is to fold back any such formed intermediate partial results by replacing them with respective congruent representations for further processing.

The first circuit may comprise a structure corresponding to a Wallace tree or a Dadda tree. The second circuit may comprise a carry look-ahead adder. The cryptographic algorithm may use only a specific prime modulus, and the modulus comprises the specific prime modulus. The encryption algorithm may be one of a Rivest-Shamir-Adleman (RSA) algorithm, an Elliptic Curve Cryptography (ECC), or a lattice-based cryptography algorithm.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A custom modular reduction digital circuit for reducing an n-bit integer based on a modulus, wherein the modulus comprises a k-bit integer for use with a cryptographic algorithm, the custom modular reduction digital circuit comprising:

a first circuit to generate at least two partial results by processing: (1) k lower order significant bits of the n-bit integer and (2) at least a subset of bits for congruent representations corresponding to any n-k higher order bits of the n-bit integer that are higher in significance than most significant bit of the k-bit integer, wherein the first circuit is to bypass subtraction operations and multiplication operations with respect to the at least two partial results; and a second circuit to process the at least two partial results, output by the first circuit, to generate a reduced version of the n-bit integer for use with the cryptographic algorithm, wherein the first circuit and the second circuit are implemented at least partly in a hardware logic component.

2. The custom modular reduction digital circuit of claim 1, wherein the generation of the at least two partial results comprises summing the k lower order significant bits of the n-bit integer with the subset of the bits for the congruent representations corresponding to any n-k higher order bits of the n-bit integer that are higher in significance than the most significant bit of the k-bit integer.

3. The custom modular reduction digital circuit of claim 2, wherein the summing results in a formation of intermediate partial results with a carryover bit having a higher significance than the most significant bit of the k-bit integer, and wherein the first circuit is to fold back any such formed intermediate partial results by replacing them with respective congruent representations for further processing.

4. The custom modular reduction digital circuit of claim 1, wherein the first circuit comprises a structure corresponding to a Wallace tree or a Dadda tree to perform addition operations.

5. The custom modular reduction digital circuit of claim 4, wherein the second circuit comprises a carry look-ahead adder.

6. The custom modular reduction digital circuit of claim 1, wherein the cryptographic algorithm uses only a specific prime modulus, and wherein the modulus comprises the specific prime modulus.

7. The custom modular reduction digital circuit of claim 1, wherein the encryption algorithm is one of a Rivest-Shamir-Adleman (RSA) algorithm, an Elliptic Curve Cryptography (ECC), or a lattice-based cryptography algorithm.

8. A method for reducing an n-bit integer based on a modulus, wherein the modulus comprises a k-bit integer for use with a cryptographic algorithm, the method comprising:

generating, via a custom modular reduction digital circuit, at least two partial results by processing: (1) k lower order significant bits of the n-bit integer and (2) at least a subset of bits for congruent representations corresponding to any n-k higher order bits of the n-bit integer that are higher in significance than most significant bit of the k-bit integer, wherein subtraction operations and multiplication operations are bypassed with respect to the at least two partial results; and processing, via the custom modular reduction digital circuit, the at least two partial results to generate a reduced version of the n-bit integer for use with the cryptographic algorithm.

9. The method of claim 8, wherein generating the at least two partial results comprises summing the k lower order significant bits of the n-bit integer with the subset of the bits for the congruent representations corresponding to any n-k higher order bits of the n-bit integer that are higher in significance than the most significant bit of the k-bit integer.

10. The method of claim 9, wherein the summing results in a formation of intermediate partial results with a carryover bit having a higher significance than the most significant bit of the k-bit integer, and wherein the method further comprises folding back any such formed intermediate partial results by replacing them with respective congruent representations for further processing.

11. The method of claim 8, wherein the cryptographic algorithm uses only a specific prime modulus, and wherein the modulus comprises the specific prime modulus.

12. The method of claim 8, further comprising precomputing the congruent representations and storing them in one or more lookup tables.

13. The method of claim 12, further comprising prior to generating the at least two partial results, retrieving the congruent representations from the one or more lookup tables.

14. A custom modular reduction digital circuit for reducing an n-bit integer based on a modulus, wherein the modulus comprises a k-bit integer for use with a cryptographic algorithm, the custom modular reduction digital circuit comprising:

a first circuit to generate at least two partial results by processing: (1) k lower order significant bits of the n-bit integer, (2) at least a subset of bits for congruent representations corresponding to any n-k higher order bits of the n-bit integer that are higher in significance than most significant bit of the k-bit integer, and (3) a constant corresponding to any negative terms associated with the congruent representations, wherein the first circuit is to bypass subtraction operations and multiplication operations with respect to the at least two partial results; and a second circuit to process the at least two partial results, output by the first circuit, to generate a reduced version of the n-bit integer for use with the cryptographic algorithm, wherein the first circuit and the second circuit are implemented at least partly in a hardware logic component.

15. The custom modular reduction digital circuit of claim 14, wherein the generation of the at least two partial results comprises summing the k lower order significant bits of the n-bit integer, the subset of the bits for the congruent representations corresponding to any n-k higher order bits of the n-bit integer that are higher in significance than the most significant bit of the k-bit integer, and the constant corresponding to any negative terms associated with the congruent representations.

16. The custom modular reduction digital circuit of claim 15, wherein the summing results in a formation of intermediate partial results with a carryover bit having a higher significance than the most significant bit of the k-bit integer, and wherein the first circuit is to fold back any such formed intermediate partial results by replacing them with respective congruent representations for further processing.

17. The custom modular reduction digital circuit of claim 15, wherein the first circuit comprises a structure corresponding to a Wallace tree or a Dadda tree to perform addition operations.

18. The custom modular reduction digital circuit of claim 17, wherein the second circuit comprises a carry look-ahead adder.

19. The custom modular reduction digital circuit of claim 14, wherein the cryptographic algorithm uses only a specific prime modulus, and wherein the modulus comprises the specific prime modulus.

20. The custom modular reduction digital circuit of claim 14, wherein the encryption algorithm is one of a Rivest-Shamir-Adleman (RSA) algorithm, an Elliptic Curve Cryptography (ECC), or a lattice-based cryptography algorithm.

* * * * *